E. WILLIAMS.
CLUTCH.
APPLICATION FILED JULY 25, 1916.

1,237,849.

Patented Aug. 21, 1917.

INVENTOR
Edward Williams
BY
ATTORNEYS

UNITED STATES PATENT OFFICE.

EDWARD WILLIAMS, OF EDGBASTON, BIRMINGHAM, ENGLAND.

CLUTCH.

1,237,849. Specification of Letters Patent. Patented Aug. 21, 1917.

Application filed July 25, 1916. Serial No. 111,125.

*To all whom it may concern:*

Be it known that I, EDWARD WILLIAMS, a subject of the King of Great Britain and Ireland, residing at 17 Sandon road, Edgbaston, in the city of Birmingham, England, have invented certain new and useful Improvements Relating to Clutches of which the following is a specification.

This invention has for its object to construct an improved friction clutch applicable for a variety of purposes but adapted more especially for use in machine tools such as lathes, milling machines and the like.

The invention comprises the combination with an inner conical sliding member which is arranged to coöperate with an outer complementary member, of a pair of radially disposed operating levers, and a rotary fulcrum on which the outer ends of the levers are pivoted, the said inner clutch member being actuated in one direction by a central rod through the medium of the levers and in the other direction by a spring.

Referring to the accompanying sheet of explanatory drawings:—

Figure 1:
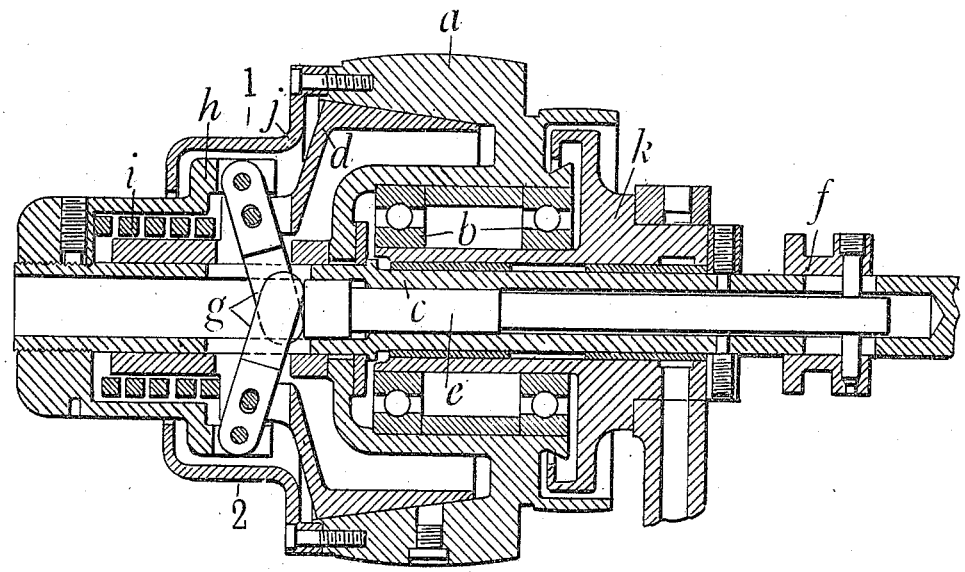
Figure 2:
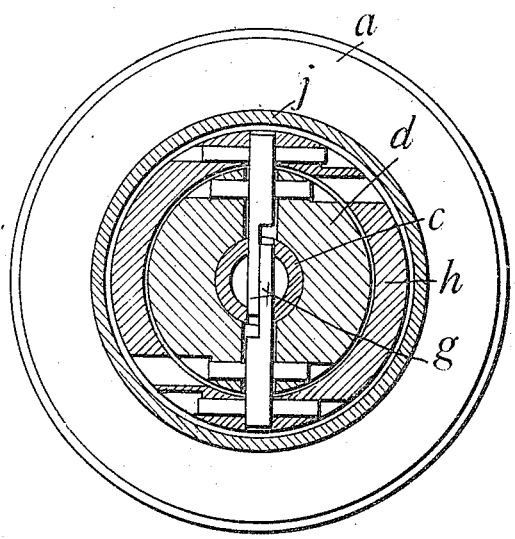

Figure 1 is a longitudinal section and Fig. 2 a cross section on the line 1.2. (Fig. 1) of a clutch constructed in accordance with this invention, the said clutch being shown applied to the driving shaft of a lathe headstock or other machine tool.

In the construction of a clutch as shown, the outer clutch member $a$ which is internally coned is in the form of a belt pulley or gear wheel and is mounted through the medium of a ball, roller or other bearing $b$ upon a central shaft $c$. The inner clutch member $d$ which is externally coned is feather-keyed to and arranged to slide on the shaft $c$. Along an aperture in the center of the shaft is disposed an axially movable rod $e$ which is actuated by any convenient means such as a fork collar $f$ and is arranged to abut at one end against the adjacent end of a pair of levers $g$. The latter pass through slots in the shaft $c$ and are mounted radially in a diametrical slot in an extension of the inner clutch member; at their outer ends the levers are pivoted to a fulcrum piece $h$ which is secured to the shaft $c$. Between the said piece $h$ and the inner clutch member a coil spring $i$ is provided. The levers and the portion of the fulcrum piece to which they are connected are inclosed by an extension $j$ from the outer clutch member $a$. For carrying the portion shown of the shaft $c$ a fixed bearing piece $k$ is employed.

The inner clutch member (and consequently the shaft) is engaged with the outer clutch member by the spring, and disengaged by the action of the central rod on the levers.

Having thus described my invention what I claim as new and desire to secure by Letters Patent is:—

1. In clutches, the combination comprising a pair of complementary conical members one of which is the driving member and the other the driven member, a shaft carrying the said members, a rotary fulcrum piece, secured to the shaft levers pivoted to the said piece and to the driven member, and having their inner ends lying adjacent to each other within the shaft, a central rod acting on the levers for moving the driven member in one direction and a spring for moving the said member in the opposite direction, substantially as described.

2. In clutches, the combination comprising a pair of complementary conical memrbes one of which is the driving member and the other the driven member, a hollow shaft carrying the said members, a rotary fulcrum piece secured to the shaft, a pair of radial levers pivoted at their outer ends to the said piece and having their inner ends lying adjacent to each other within the shaft, said levers being also pivoted to the driven member, a central rod acting on the levers for moving the driven member in one direction and a spring for moving the said member in the opposite direction, substantially as described.

3. In clutches, a combination comprising an outer internally coned driving member, an inner externally coned driven member, a hollow shaft carrying said members, a rotary hollow fulcrum piece secured to the shaft, a pair of radial levers pivoted at their outer ends to the said piece and having their inner ends lying adjacent to each other within the shaft, said levers being also pivoted to the driven member, a central rod acting on the levers for moving the driven member in one direction, and a spring inclosed by the fulcrum piece for moving the driven member in the opposite direction, substantially as described.

In testimony whereof I have signed my name to this specification.

EDWARD WILLIAMS.